United States Patent [19]

Lloyd

[11] Patent Number: 4,666,116
[45] Date of Patent: May 19, 1987

[54] CONNECTOR CLAMP FOR ATTACHMENT TO AN ANGLE IRON MEMBER OR THE LIKE

[75] Inventor: Floyd R. Lloyd, Lancaster, Ohio

[73] Assignee: Communication Equipment & Service Corp., Westerville, Ohio

[21] Appl. No.: 846,196

[22] Filed: Mar. 31, 1986

[51] Int. Cl.$^4$ ............................................. A47B 96/06
[52] U.S. Cl. ...................................... 248/228; 248/72
[58] Field of Search .............. 248/228, 72, 229, 231.7; 24/486, 571, 456, 570; 52/484

[56] References Cited

U.S. PATENT DOCUMENTS

| | | | |
|---|---|---|---|
| 759,560 | 5/1904 | Sharp | 248/231.7 X |
| 1,237,525 | 8/1917 | Keator | 248/228 UX |
| 2,617,473 | 11/1952 | Krimstock et al. | 248/228 X |
| 2,875,969 | 3/1959 | Thompson | 248/72 |
| 3,301,513 | 1/1967 | Sugaya | 248/228 X |
| 3,445,081 | 5/1969 | Roussos | 248/228 X |

FOREIGN PATENT DOCUMENTS 611338  10/1948  United Kingdom ................ 248/228

Primary Examiner—J. Franklin Foss
Attorney, Agent, or Firm—William S. Rambo; Wm. Cates Rambo

[57] ABSTRACT

A connector clamp for attachment to a supporting angle member features a general G shape which provides an entrapping interfit between the clamp and angle member. The clamp also provides threaded openings or sockets to receive cooperatively threaded studs or shanks of items of hardware to be connected with the angle member.

4 Claims, 4 Drawing Figures

CONNECTOR CLAMP FOR ATTACHMENT TO AN ANGLE IRON MEMBER OR THE LIKE

TECHNICAL FIELD

This invention relates generally to connector clamps and more specifically to an improved connector clamp used for securing or attaching wave guide hardware or the like to an angle iron frame component of an antenna supporting tower or mast.

In the past, it has been the common practice to secure wave guide hardware and the like to the angle iron frame members of an antenna-supporting tower either by drilling openings through the frame member and then bolting or screw-fastening an attachment member such as a clevis or clamp directly to the frame member. Also, attempts have been made to fasten various types of hardware to angle iron members by means of conventional C, or U-shaped clamps.

However, known prior art clamping devices and procedures have been largely deficient due to their inability to withstand severe and prolonged weather conditions without weakening, or loosening, or damaging one or more of the members with which they were connected. In the case of wave guide hardware, it is essential that a tight and properly aligned connection be maintained between the hardware and the associated supporting tower or mast.

The most pertinent prior art presently known to the applicant is represented by U.S. Pat. Nos. 2,756,789 issued July 3, 1956 to Kraus et al; 3,301,513 issued Jan. 31, 1967 to Sugaya; and 3,445,081 issued May 20, 1969 to Roussos. While these patents disclose various forms and constructions of clamps which are designed to detachably fasten, or connect, one member to another, they do not provide for the effective embracement and entrapment of a supporting angle iron member within the clamping devices.

DISCLOSURE OF THE INVENTION

This invention provides an improved connector clamp which is particularly useful in fastening wave guide hardware and/or antenna components to an L-shaped, angle iron frame member of an antenna-supporting tower or mast. The connector clamp of this invention comprises a rigid metallic strap-like body having the general shape of the letter "G", and formed with a substantially straight bight portion and a pair of integral, relatively spaced, parallel arms extending outwardly to one side of the bight portion of the body. One of the arms is longer than the other and is formed with a return bent terminal end portion disposed in relatively spaced, acutely angular relation to the main body portion of the one leg. Preferably, each of the bight portion, the other leg, and the terminal end portion of the one leg are formed with screw-threaded openings, and a clamping bolt or the like is threadedly carried in the opening of the terminal end portion of the one leg for clamping engagement with an angle iron member embraced by the clamp body. The main body portion of the one leg is formed with a serrated surface disposed opposite the clamping bolt to increase frictional engagement between the clamp and the angle iron member. The bight portion of the clamp body is also preferably formed at its juncture with the one leg with a laterally offset portion which defines an entrant corner on the clamp displaced away from the corner region of an angle iron member embraced by the clamp.

The principal object of the present invention is to provide a mechanically efficient yet economical clamp for detachably connecting various articles of hardware to an an angle iron support member.

DESCRIPTION OF PREFERRED EMBODIMENT

Figure 1:
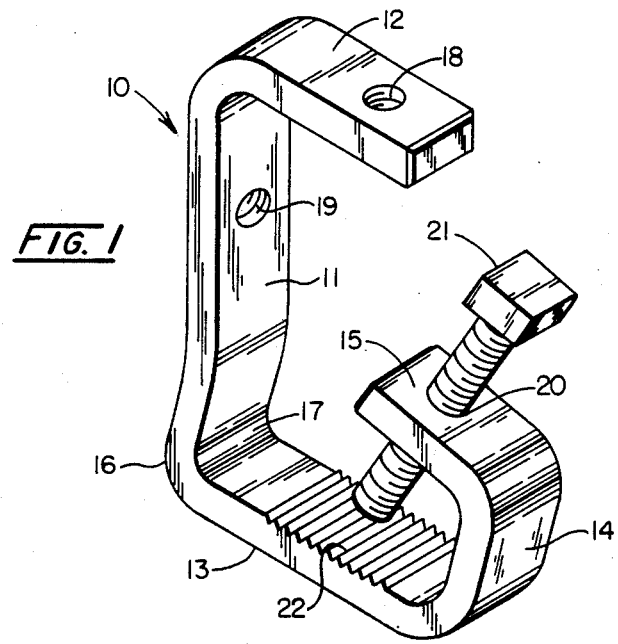
FIG. 1 is a perspective view of a connector clamp according to this invention.
Figure 3:
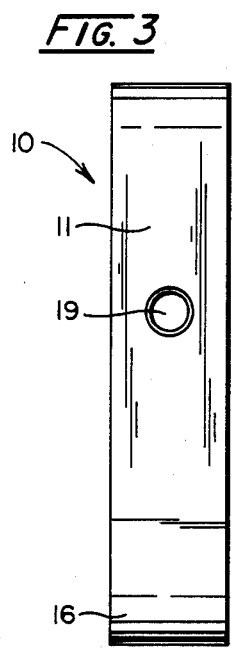
FIG. 3 is a side elevational view looking toward the bight portion of the clamp.
Figure 2:
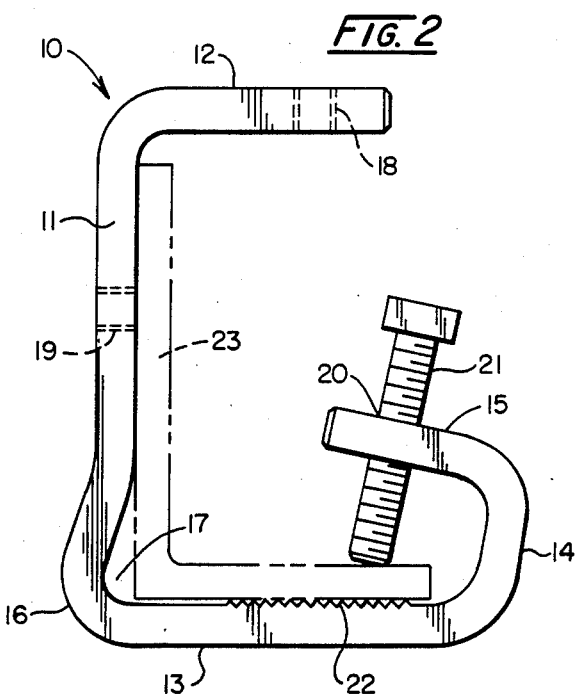
FIG. 2 is a front elevational view of the clamp showing it attached to an iron support member.
Figure 4:
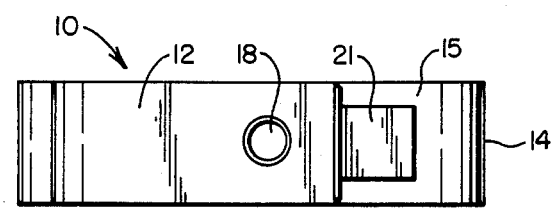
FIG. 4 is a plan view looking toward the shorter leg of the clamp.

As shown particularly in FIGS. 1 and 2 of the drawings, the present connector clamp comprises a rigid, strap-like body 10 of metallic composition, preferably galvanized or stainless steel, having an overall shape resembling the letter "G". The body 10 includes a generally straight bight portion or web 11 which terminates at its opposite ends in two, integral but relatively spaced apart legs 12 and 13. The legs 12 and 13 extend outwardly from the same side of the bight portion 11 and the main body portions of the legs 12 and 13 are disposed in spaced parallel relation to one another. However, the leg 13 is considerably longer than the leg 12 and is formed with a return bend 14 which provides a terminal end portion or extention 15 disposed in acutely angular spaced relation to the main body portion of the leg 13.

The bight portion 11 of the body 10 is formed adjacent the leg 13 with a slightly laterally offset bend 16 which defines with the leg 13 a laterally outwardly displaced entrant corner region 17.

Each of leg 12, the bight portion 11 and the terminal end portion 15 of the leg 13 are formed with screw-threaded openings 18, 19, and 20, respectively. A clamping bolt 21 is threadedly carried in the opening 20 of the end portion or extension 15 of the leg 13 and the main body portion of the leg 13 is preferably formed with a roughened or serrated friction area 22 disposed in alignment with the clamping bolt 21.

In operation, the improved connector clamp is intended to be fitted onto and embrace a relatively stationary and rigid L-shaped angle member 23, as shown by chain lines in FIG. 2. To apply the clamp to the angle member 23, the clamping bolt 21 is loosened or backed out in the threaded opening 20 to open the space or mouth between the terminal end portion 15 and the main body portion of the leg 13. The clamp is then rotated, turned, or warped onto the angle member to place the inner surfaces of the bight portion 11 and the main body portion of the leg 13 closely adjacent the outer surfaces of the L-shaped angle member with the return bend 14 of the leg 13 hooked around an edge of the angle member. The clamping bolt or screw 21 is then tightened to bring its beveled nose into engagement with the angle member and finally to draw the inner surface of the leg 13 and the bight portion 11 into snug, tight-fitting engagement with the adjacent outer surfaces of the angle member. The relatively entrant corner 17 of the clamp provides a clearance for the adjacent corner edge of the angle member and thus permits the inner faces of the bight portion 11 and the main body portion of the leg 13 to be forced into tight, face-to-face engagement with the adjacent surfaces of the angle member. The roughened or serrated area of the leg 13 tends to dig into the adjacent outer surface of the angle member when the clamping bolt 21 is tightened and the clamp is thus firmly and securely fastened to the angle member. Also, due to the configuration of the clamp and the relative interfit of the legs of the angle member into the coves or recesses of the clamp, the clamp will normally remain in position on the supporting angle member even should the clamping bolt be loosened by transient vibrations.

With the clamp securely engaged on the angle member, the threaded openings 18 and 19 formed in the shorter leg 12 and bight portion 11 of the clamp provide convenient receptacles for the cooperatively threaded attachment shanks or studs of a wave guide stand-off or other pieces of hardware normally associated with an antenna-supporting tower or mast.

While a single preferred embodiment of the invention has been illustrated and described in detail, it will be understood that various modifications in details of construction and design may be resorted to without departing from the spirit of this invention or the scope of the following claims.

I claim:

1. A connector clamp for embracing application to an L-shaped angle member comprising a generally G-shaped, rigid metallic body formed with a substantially straight bight portion and a pair of relatively spaced apart, generally parallel legs integrally joined with and having main body portions extending outwardly to one side of the bight portion of said body, one of said legs being substantially longer than the other and terminating in an integral return bend extension disposed in relatively spaced apart, acutely angular relation to the main body portion of said one leg, the return bend extension of said one leg being formed with a screw-threaded opening extending therethrough; and a clamping member threadedly carried in the opening of said return bend extension and disposed in acutely angular relation to said one leg and to the bight portion of said body and arranged to engage an angle member embraced by said body and to draw both the bight portion and said one leg of said body into tight-fitting engagement with such angle member.

2. A connector clamp according to claim 1, wherein each of the bight portion and other leg of said body are formed with screw-threaded openings to receive cooperatively threaded attachments.

3. A connector clamp according to claim 1, wherein said one of said legs is formed with a serrated surface disposed opposite said clamping member.

4. A connector clamp according to claim 1, wherein the bight portion of said body is formed adjacent said one leg with a laterally offset, entrant corner-forming region.

* * * * *